United States Patent
Davidson

(10) Patent No.: US 12,027,993 B2
(45) Date of Patent: Jul. 2, 2024

(54) CHAIN-LINK MODULES FOR VOLTAGE SOURCE CONVERTERS

(71) Applicant: General Electric Technology GmbH, Baden (CH)

(72) Inventor: Colin Davidson, Stafford (GB)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 153 days.

(21) Appl. No.: 17/795,683

(22) PCT Filed: Jan. 25, 2021

(86) PCT No.: PCT/EP2021/051575
§ 371 (c)(1),
(2) Date: Jul. 27, 2022

(87) PCT Pub. No.: WO2021/151819
PCT Pub. Date: Aug. 5, 2021

(65) Prior Publication Data
US 2023/0119315 A1  Apr. 20, 2023

(30) Foreign Application Priority Data

Jan. 30, 2020 (EP) ..................................... 20275020

(51) Int. Cl.
*H02M 7/483* (2007.01)
*H02M 1/32* (2007.01)

(52) U.S. Cl.
CPC ......... *H02M 7/4835* (2021.05); *H02M 1/322* (2021.05)

(58) Field of Classification Search
CPC ........ H02M 1/32; H02M 1/322; H02M 7/483; H02M 7/4835; H02M 7/4833; H02M 7/5388
See application file for complete search history.

(56) References Cited

U.S. PATENT DOCUMENTS

2015/0124506 A1*  5/2015  Sahoo ................. H02M 7/4835
363/126

FOREIGN PATENT DOCUMENTS

CN  101051751 A  10/2007
CN  106998151 A  8/2017
(Continued)

OTHER PUBLICATIONS

International Search Report in PCT/EP2021/051575 dated Apr. 6, 2021 (4 pages).
(Continued)

*Primary Examiner* — Thienvu V Tran
*Assistant Examiner* — Yahveh Comas Torres
(74) *Attorney, Agent, or Firm* — Eversheds Sutherland (US) LLP

(57) ABSTRACT

In the field of chain-link modules for voltage source converters, there is a need for an improved chain-link module. Embodiments of the disclosure include a chain-link module, for connection in series with other chain-link modules to form a chain-link converter selectively operable to provide a stepped variable voltage source within a voltage source converter. The module can include a first pair of series-connected switching elements which are separated by a first connection terminal and are connected in parallel with first and second series-connected energy storage devices. The chain-link module can also include a second pair of series-connected switching elements that are separated by a second connection terminal, and which are connected in parallel with one or other of the first and second energy storage devices.

5 Claims, 3 Drawing Sheets

(56) References Cited

FOREIGN PATENT DOCUMENTS

Figure 1:
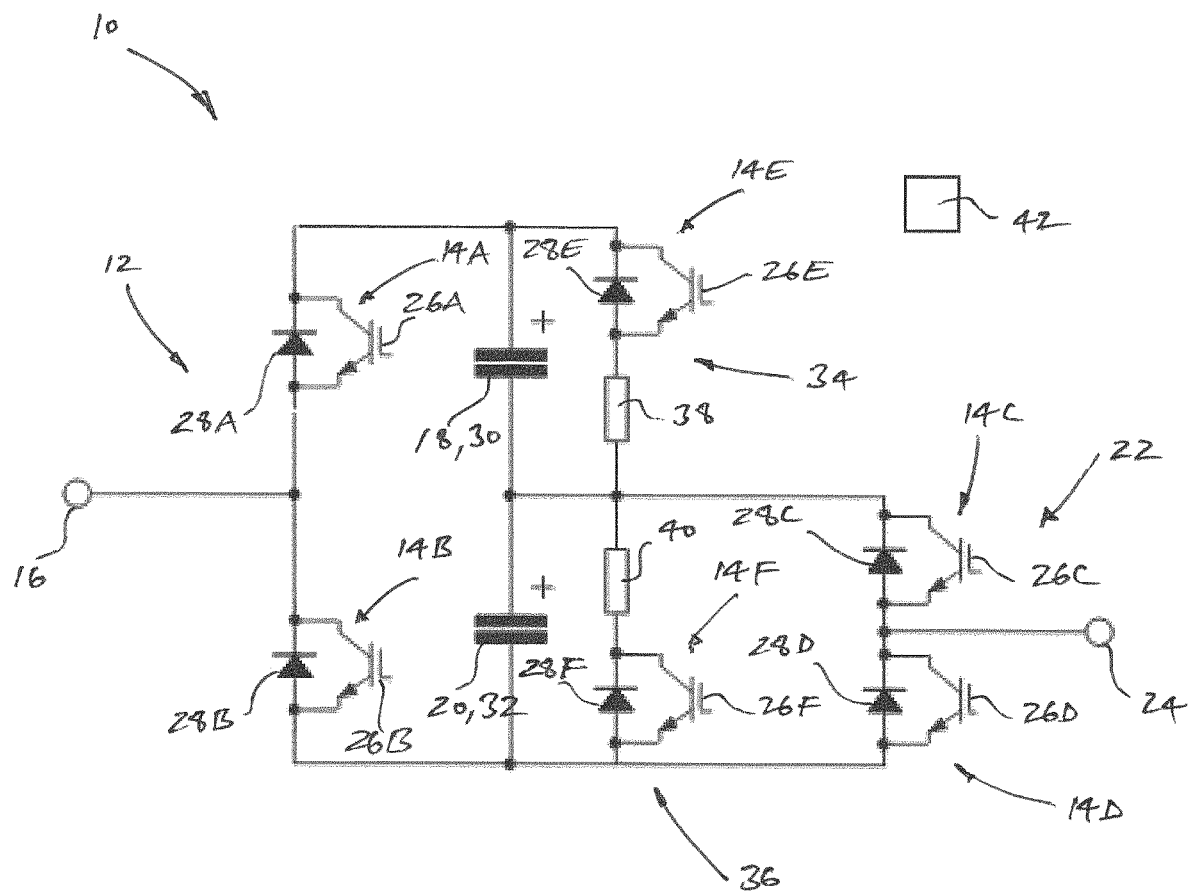

| | | | | |
|---|---|---|---|---|
| CN | 109120174 | A | 1/2019 | |
| CN | 106877718 | B | 4/2019 | |
| EP | 2650999 | A2 | 10/2013 | |
| EP | 2852019 | A1 | 3/2015 | |
| EP | 2852040 | A1 * | 3/2015 | .............. H02M 1/32 |
| EP | 3373438 | A1 | 9/2018 | |
| EP | 3544163 | A1 * | 9/2019 | .............. H02M 1/32 |
| EP | 3547525 | A1 * | 10/2019 | .......... H02M 1/0095 |
| WO | WO-2019063078 | A1 * | 4/2019 | ............ H02M 7/483 |

OTHER PUBLICATIONS

Nami et al. Modular Multilevel Converters for HVDC Applications: Review on Converter Cells and Functionalities. IEEE Transactions on Power Electronics 30.1 (2015): 18-36.

Adam, et al. New Efficient Submodule for a Modular Multilevel Converter in Multiterminal HVDC Networks. IEEE Transactions on power electronics 32.6 (2017): 4258-4278.

Lu, et al. Imbalance Mechanism and Balanced Control of Capacitor Voltage for a Hybrid Modular Multilevel Converter. IEEE Transactions on Power Electronics 33.7 (2018): 5686-5696.

Li et al.: An enhanced MMC topology with DC fault ride-through capability. IECON 2013—39th Annual Conference of the IEEE Industrial Electronics Society, Vienna, Austria, 2013, pp. 6182-6188, doi: 10.1109/IECON.2013.6700152.

Kim et al.: DC fault protection for modular multilevel converter HVDC using asymmetrical unipolar full-bridge submodule. 2015 9th International Conference on Power Electronics and ECCE Asia (ICPE-ECCE Asia), Seoul, Korea (South), 2015, pp. 1083-1089, doi: 10.1109/ICPE.2015.7167915.

* cited by examiner

CHAIN-LINK MODULES FOR VOLTAGE SOURCE CONVERTERS

CROSS-REFERENCE TO RELATED APPLICATIONS

This application is a U.S. National Stage Application under 35 U.S.C. 371 and claims the priority benefit of International Application No. PCT/EP2021/051575, filed Jan. 25, 2021, which claims priority to European Application No. 20275020.4, filed Jan. 30, 2020, both of which are incorporated herein by reference.

This invention relates to a chain-link module, for connection in series with other chain-link modules to form a chain-link converter selectively operable to provide a stepped variable voltage source within a voltage source converter, and to such a voltage source converter.

In HVDC power transmission networks AC power is typically converted to DC power for transmission via overhead lines, under-sea cables and/or underground cables. This conversion removes the need to compensate for the AC capacitive load effects imposed by the power transmission medium, i.e. the transmission line or cable, and reduces the cost per kilometre of the lines and/or cables, and thus becomes cost-effective when power needs to be transmitted over a long distance. DC power is also transmitted directly from offshore wind parks to onshore AC power transmission networks.

The conversion between DC power and AC power is utilized where it is necessary to interconnect DC and AC networks. In any such power transmission network, converters (i.e. power converters) are required at each interface between AC and DC power to effect the required conversion from AC to DC or from DC to AC.

One type of power converter is a voltage source converter, although other types of power converter are also possible.

Such a voltage source converter includes first and second DC terminals between which extends at least one converter limb, and typically three converter limbs each of which corresponds to a given phase of a three-phase electrical power system.

The or each converter limb includes first and second limb portions which are separated by an AC terminal.

In use the first and second DC terminals are connected to a DC network, and the or each AC terminal is connected to a corresponding phase of an AC network.

Each limb portion includes a chain-link converter which extends between the associated AC terminal and a corresponding one of the first or the second DC terminal. Each chain-link converter includes a plurality of series connected chain-link modules, while each chain-link module includes a number of switching elements which are connected in parallel with an energy storage device, usually in the form of a capacitor. Other types of energy storage device, i.e. any device that is capable of storing and releasing energy to selectively provide a voltage, e.g. a fuel cell or battery, may also be used however.

The provision of a plurality of chain-link modules means that it is possible to build up a combined voltage across each chain-link converter, via the insertion of the energy storage devices, i.e. the capacitors, of multiple chain-link modules (with each chain-link module providing its own voltage), which is higher than the voltage available from each individual chain-link module.

Accordingly, each of the chain-link modules work together to permit the chain-link converter to provide a stepped variable voltage source. This permits the generation of a voltage waveform across each chain-link converter using a step-wise approximation. As such each chain-link converter is capable of providing a wide range of complex waveforms.

For example, operation of each chain-link converter in the foregoing manner can be used to generate an AC voltage waveform at the or each AC terminal, and thereby enable the voltage source converter to provide the aforementioned power transfer functionality between the AC and DC networks.

According to a first aspect of the invention there is provided a chain-link module, for connection in series with other chain-link modules to form a chain-link converter selectively operable to provide a stepped variable voltage source within a voltage source converter, the chain-link module comprising:

a first pair of series-connected switching elements separated by a first connection terminal and connected in parallel with first and second series-connected energy storage devices; and a second pair of series-connected switching elements separated by a second connection terminal and connected in parallel with one or other of the first and second energy storage devices;

switching of the switching elements, in use, selectively (i) directing current through the first and second energy storage devices, whereby the chain-link module provides a positive voltage across the first and second connection terminals;

(ii) causing current to bypass the first and second energy storage devices whereby the chain-link module provides zero voltage; and (iii) directing current through the one of the first and second energy storage devices with which the second pair of switching elements is connected in parallel, whereby the chain-link module provides a negative voltage across the first and second connection terminals.

Having a chain-link module that is able to provide a positive voltage is desirable because it allows a chain-link converter within which the module is located to generate a regular voltage of the type that is needed for normal power transmission by an associated voltage source converter. Such a positive voltage can also be used to oppose a fault current flowing from the first connection terminal to the second connection terminal.

In addition, arranging the second pair of series-connected switching elements in parallel with only one of the energy storage devices, and separating them with the second connection terminal, means that when such a positive voltage is being provided (i.e. during normal power transmission by an associated voltage source converter) current can be directed through both energy storage devices, as required, via only two switching elements.

Hence, a conduction ratio of one switching element in series per energy storage device is achieved. This results in the chain-link module of the invention having lower conduction losses than, e.g. other chain-link modules with a greater equivalent number of switching elements conducting in series per energy storage device, when providing a positive voltage for normal power transmission by a corresponding associated voltage source converter.

Moreover, arranging the second pair of switching elements in the aforementioned manner permits the use of selective switching of those switching elements, while the chain-link module is otherwise providing a positive voltage during normal power transmission, to alter the ratio of energy stored by each of the first and second energy storage devices. For example, such selective switching of the switching elements may be used to re-balance the energy stored by each energy storage device, which is desirable in some operating circumstances.

Meanwhile, the ability of the chain-link module to selectively provide a negative voltage is advantageous because it can be used to oppose a DC fault current flowing through the chain-link module from the second connection terminal to the first connection terminal and so, in conjunction with the aforementioned positive voltage capability, enables a chain-link converter within which the module is, in use, located (and hence also an associated voltage source converter including such a chain-link converter) to provide full DC fault clearing functionality, i.e. the ability to clear DC fault currents flowing in either direction between the first and second connection terminals. Thus, the need otherwise for expensive and space-consuming DC circuit breakers is avoided.

A further benefit is that such DC fault clearing functionality can be provided using a plurality of identical chain-link modules of the invention within an associated chain-link converter. This simplifies the manufacture and subsequent control of such a chain-link converter compared to, e.g. a chain-link converter incorporating chain-link modules that differ from one another.

Moreover, being able to selectively provide a negative voltage also allows first and second chain-link converters (having one or more chain-link modules of the invention therein) to work together in a converter limb of an associated voltage source converter to over-modulate, i.e. generate a positive converter limb voltage which is greater than the DC operating voltage of a corresponding DC network with which the voltage source converter is connected, or generate a negative converter limb voltage.

Preferably at least one of the energy storage devices has a selectively operable rapid discharge circuit connected therewith.

The inclusion of one or more such rapid discharge circuits advantageously permits, e.g. in emergency conditions, the removal of excess stored energy from the corresponding energy storage device.

For example, when providing a negative voltage to oppose a DC fault current flowing from the second connection terminal to the first connection terminal, the energy stored by the said one of the first and second energy storage devices (with which the second pair of switching elements are connected in parallel) will rise transiently as a result of inductive energy being stored as the fault current is suppressed, and the triggering, i.e. selective operation, of a rapid discharge circuit connected with the said storage device affected by the additional inductive energy, can be used to reduce the amount of energy stored.

In a preferred embodiment of the invention each energy storage device has a selectively operable rapid discharge circuit connected therewith.

Providing each energy storage device with a rapid discharge circuit allows the energy stored by each energy storage device to be reduced, as mentioned hereinabove. In addition, however, each energy storage device having a rapid discharge circuit also permits the relative ratio of energy stored by the first and second energy storage devices to be altered, e.g. to re-balance the energy so stored.

Optionally at least one of the switching elements in the second pair of switching elements has a lower voltage rating than one or both of the switching elements in the first pair of switching elements.

The positive voltage provided by the chain-link module has a first magnitude that is commensurate with the combined energy stored by the first and second energy storage devices, whereas the negative voltage provided has a second magnitude which is commensurate with only the energy stored by the said one of the first and second energy storage devices with which the second pair of switching elements is connected in parallel. The second magnitude is therefore lower than the first magnitude, and so the voltage that must be supported by the second pair of switching elements is also lower than that which has to be supported by the first pair of switching elements.

In turn, this can be exploited by including one or more switching elements in the second pair with a lower voltage rating, which advantageously reduces both the cost and power losses associated with the or each said lower voltage rated switching element.

The chain-link module may further include a module controller programmed to cause the first and second energy storage devices to store different amounts of energy.

Having the first and second energy storage devices store different amounts of energy advantageously allows for a tuning of an associated DC fault clearing functionality.

For example, having the energy storage device connected in parallel with the second pair of switching elements store more energy than the other energy storage device means that the negative voltage provided by the chain-link module is larger than would be the case if both energy storage devices stored the same amount of energy. A consequence of being able to provide such a larger negative voltage is that it achieves more rapid DC fault clearing.

According to a second aspect of the invention there is provided a voltage source converter comprising at least one chain-link converter having a plurality of series-connected chain link modules, at least one of the said chain-link modules being a chain-link module as described hereinabove.

The voltage source converter of the invention shares the benefits of the corresponding features of the chain-link module of the invention.

It will be appreciated that the use of the terms "first" and "second", and the like, in this patent specification is merely intended to help distinguish between similar features (e.g. the first and second series-connected energy storage devices), and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

There now follows a brief description of preferred embodiments of the invention, by way of non-limiting example, with reference being made to the following figures in which:

FIG. 1 shows a chain-link module according to an embodiment of the invention; and FIGS. 2(a) to 2(d) illustrate different current flow paths through the chain-link module shown in FIG. 1, whereby the chain-link module is able to provide a positive, zero and negative voltage.

A chain-link module according to a first embodiment of the invention is designated generally by reference numeral 10.

The chain-link module 10 includes a first pair 12 of series-conducted switching elements, i.e. series-connected first and second switching elements 14A, 14B, that are separated by a first connection terminal 16, and which are also connected in parallel with first and second series-connected energy storage devices 18, 20.

The chain-link module 10 also includes a second pair 22 of series-connected switching elements, i.e. series-connected third and fourth switching elements 14C, 14D, which are separated by a second connection terminal 24.

In contrast to the first pair 12 of switching elements 14A, 14B, the second pair 22 of switching elements 14C, 14D is connected in parallel with only one of the first and second energy storage devices 18, 20. In the embodiment shown this is the second energy storage device 20, although in other embodiments of the invention (not shown) the second pair of switching elements may instead be connected in parallel with only the first energy storage device.

The first switching element 14A includes a first semiconductor device, in the form of a first IGBT 26A, which is connected in parallel with a first anti-parallel diode 28A. The second, third and fourth switching elements 14B, 14C, 14D similarly include corresponding second, third and fourth IGBTs 26B, 26C, 26D that are connected in parallel with a corresponding second, third or fourth anti-parallel diode 28B, 28C, 28D.

The inclusion of such a self-commutated semiconductor device, i.e. IGBT, in each switching element 14A, 14B, 14C, 14D means that each said switching element 14A, 14B, 14C, 14D can be considered an active switching element because it can be turned on and off, at will, by a control signal. This is in contrast to, e.g. a passive current check element alone, which instead requires a biasing voltage to be applied across its conduction terminals in order to cause it to allow or block the flow of current therethrough. It is not always possible to provide such a biasing voltage, and so such passive elements cannot be turned on and off at will.

Returning to the embodiment shown, each of the switching elements 14A, 14B, 14C, 14D shares the same configuration in that each includes an IGBT 26A, 26B, 26C, 26D arranged in parallel with a corresponding anti-parallel diode 28A, 28B, 28C, 28D, although this need not necessarily be the case in other embodiments of the invention.

For example, it is possible to use one or more other types of self-commutated semiconductor devices, such as a gate turn-off thyristor (GTO), a field effect transistor (FET), a metal-oxide-semiconductor field-effect transistor (MOSFET), an injection-enhanced gate transistor (IEGT), an integrated gate commutated thyristor (IGCT), a bimode insulated gate transistor (BIGT) or any other self-commutated switching device instead of an IGBT. In addition, one or more of the semiconductor devices may instead include a wide-bandgap material such as, but not limited to, silicon carbide, boron nitride, gallium nitride and aluminium nitride.

The number of semiconductor devices in each switching element 14A, 14B, 14C, 14D may vary depending on the required voltage and current ratings of that switching element 14A, 14B, 14C, 14D.

Alternative passive current check elements, i.e. alternatives to the anti-parallel diodes 28A, 28B, 28C, 28D may also be included in other embodiments of the invention, e.g. any alternative element that is capable of limiting current flow in only one direction. The number of passive current check elements in each switching element 14A, 14B, 14C, 14D may vary too depending on the required voltage and current ratings of that switching element 14A, 14B, 14C, 14D.

In the particular embodiment shown, each of the switching elements in the second pair 22 of switching elements, i.e. each of the third and fourth switching elements 14C, 14D, has a lower voltage rating than both of the switching elements in the first pair 18 of switching elements, i.e. than both the first and second switching elements 14A, 14B. By way of example, each of the first and second switching elements 14A, 14B may be rated at 6.5 kV, while the third and fourth switching elements 14C, 14D may be less expensive and less lossy 3.3 kV rated switching elements.

Meanwhile, the first and second energy storage devices 18, 20 take the form of corresponding first and second capacitors 30, 32, although other types of energy storage device, i.e. other types of device capable of storing and releasing energy to selectively provide a voltage, e.g. a fuel cell or battery, may be used.

In addition to the foregoing, each energy storage device 18, 20, i.e. each of the first and second capacitors 30, 32 has a corresponding first or second selectively operable rapid discharge circuit 34, 36 connected therewith, and more particularly connected in parallel therewith.

The first rapid discharge circuit 34 is formed from a further, fifth switching element 14E comprising a fifth IGBT 26E connected in parallel with a fifth anti-parallel diode 28E, which in turn is connected in series with an energy dissipating element in the form of a first resistor 38.

The second rapid discharge circuit 36 similarly is formed from a sixth switching element 14F, comprising a sixth IGBT 26F connected in parallel with a sixth anti-parallel diode 28F, arranged in series with a second resistor 40.

The fifth and sixth switching elements 14E, 14F may have the same rating as the third and fourth switching elements 14C, 14D, e.g. 3.3 kV, although this need not necessarily be the case.

The fifth and sixth switching elements and anti-parallel diodes 14E, 14F, 28E, 28F may also differ in the same manner as described hereinabove, and other forms of energy dissipating element may also be used in other embodiments of the invention (not shown).

In use, the first to fourth switching elements 14A, 14B, 14C, 14D are selectively switched, e.g. by a module controller 42 programmed to control such switching, in order to direct current I through the chain-link module 10 along different current flow paths in order to cause the chain-link module 10 to provide a positive, zero and negative voltage.

Figure 2A:
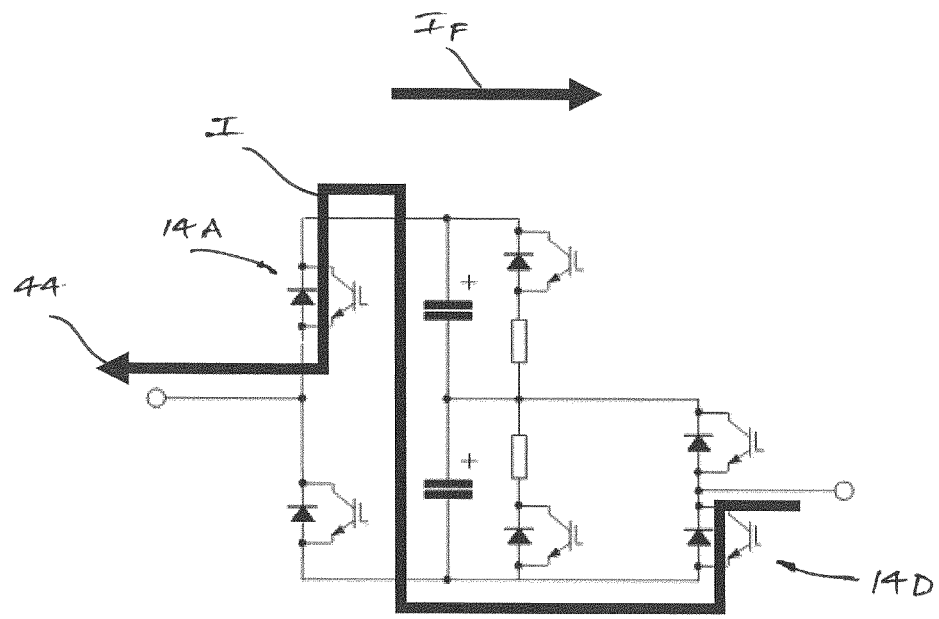

More particularly, switching on of the first and fourth switching elements 14A, 14D, i.e. switching on of the corresponding first and fourth IGBTs 26A, 26D therein, directs current I in a first direction 44 through the chain-link module 10 from the second connection terminal 24 to the first connection terminal 16 and through both of the first and second energy storage devices 18, 20, i.e. through both of the first and second capacitors 30, 32, as shown schematically in FIG. 2(a). This causes the chain-link module 10 to provide a positive voltage with a first magnitude which is commensurate with the combined energy, i.e. equal to the sum of the voltages, stored by the first and second capacitors 30, 32.

Such a positive voltage contributes towards the provision of a regular voltage by a chain-link converter within which the chain-link module 10 is, in use, included, and thereby facilitates normal power transfer by an associated voltage source converter within which the said chain-link converter is, in turn, incorporated.

In addition, such a positive voltage can be used to oppose, and subsequently extinguish, a DC fault current $I_F$ flowing in a second direction 46, opposite the first direction 44, through the chain-link module 10 from the first connection terminal 16 to the second connection terminal 24.

Figure 2D:
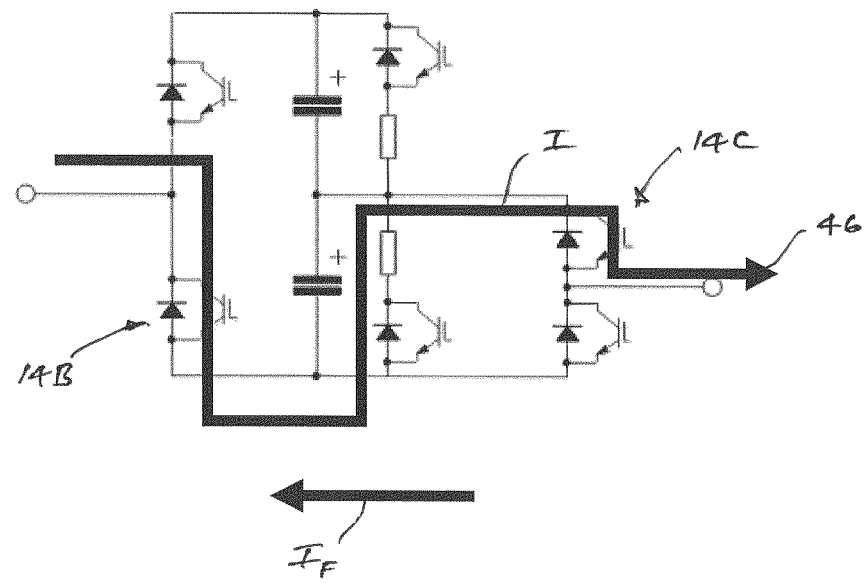
Figure 2B:
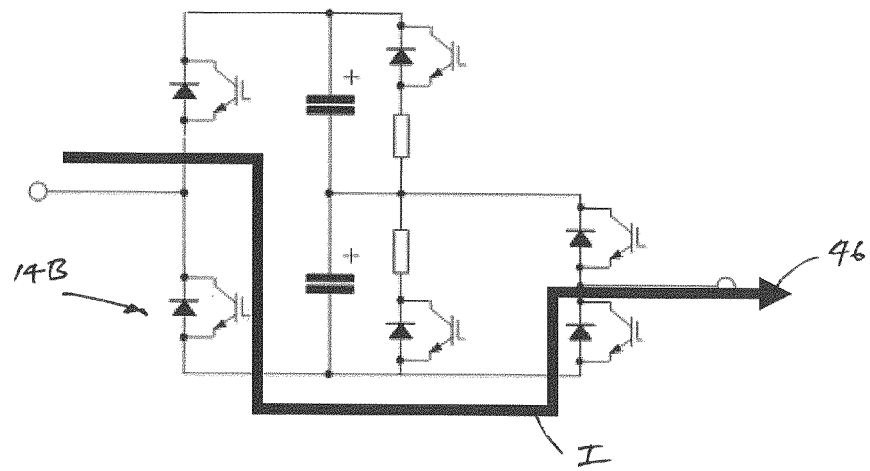

In the meantime, switching on of only the second switching element 14B, i.e. the second IGBT 26B therein, causes current I flowing in the second direction 46 through the chain-link module 10 to bypass both capacitors 30, 32, as shown schematically in FIG. 2(b), and thereby causes the chain-link module 10 to provide zero voltage.

Figure 2C:
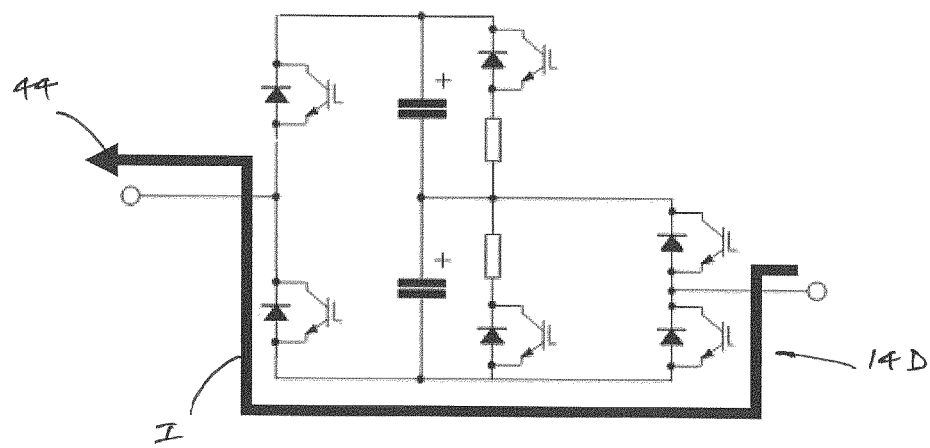

Similarly, switching on of only the fourth switching element 14D, i.e. the fourth IGBT 26D therein, causes current I flowing in the first direction 44 through the chain-link module 10 to bypass both capacitors, 30, 32, as shown schematically in FIG. 2(c), and thereby again causes the chain-link module to provide zero voltage.

Meanwhile, switching on of the second and third switching elements 14B, 14C directs current I in the second direction 46 through the chain-link module 10, i.e. from the first terminal 16 to the second terminal 24, and through only the second capacitor 32, as shown schematically in FIG. 2(d). This causes the chain-link module to provide a negative voltage with a second magnitude that is commensurate with the energy stored by only the second capacitor 32, i.e. equal to the voltage stored by only the second capacitor 32.

Such a negative voltage can, nevertheless, still be used to oppose, and subsequently extinguish, a DC fault current $I_F$ flowing in the first direction 44 through the chain-link module 10 from the second terminal 24 to the first terminal 16.

In circumstances where the first and second capacitors 30, 32, i.e. the first and second energy storage devices 18, 20, store the same amount of energy, i.e. are charged to the same voltage, the first magnitude of the positive voltage is double the second magnitude of the negative voltage.

In other embodiments, e.g. in which the module controller 42 is programmed to cause the first and second energy storage devices 18, 20, i.e. the first and second capacitors 30, 32, to store different amounts of energy, the first magnitude of the positive voltage is not exactly double the second magnitude of the negative voltage.

For example, the first capacitor 30 may be controlled to store a voltage of 1.8 kV, while the second capacitor 32 is controlled to store a larger voltage of 2.2 kV. In such circumstances, the first magnitude of the positive voltage will remain as the sum of the voltages stored by the first and second capacitors 30, 32, e.g. 4.0 kV, while the second magnitude of the negative voltage will be more than half of the positive voltage, i.e. will be equal to the voltage stored by the second capacitor 32, e.g. will be 2.2 kV.

In addition to the foregoing, the third switching element 14C, i.e. the third IGBT 26C therein, may be switched on to direct current I to flow in the second direction 46 from the first connection terminal 16, through the first anti-parallel diode 28, through only the first capacitor 30 and, through the said third IGBT 26C to the second connection terminal 24.

Alternatively, the first switching element 14A, i.e. the first IGBT 26A therein, may be switched on to directing current I to flow in the first direction 44 from the second connection terminal 24, through the third anti-parallel diode 28C, through only the first capacitor 30 and, through the said first IGBT 26A to the first connection terminal.

Directing current I to flow through only the first capacitor 30 in either of the foregoing manners, may be used for a short duration to adjust the ratio of energies stored by the first and second capacitors 30, 32.

It may also be used, perhaps only for a few microseconds at a time, to provide a transition between a fully bypassed chain-link module 10 providing zero voltage, and one providing a full positive voltage of the first magnitude, e.g. in order to reduce the size of voltage step imposed on an associated external system.

Additionally, in use, one or other, or both, of the rapid discharge circuits 34, 36 may be triggered, i.e. by turning on the IGBT 26E, 26F in the corresponding fifth or sixth switching element 14E, 14F to remove energy, i.e. voltage, from the energy storage device 18, 20, i.e. capacitor 30, 32 with which it is connected.

A voltage source converter according to a second embodiment of the invention (not shown) comprises at least one chain-link converter having a plurality of series-connected chain-link modules, at least one of the said chain-link modules being a chain-link module 10, as described hereinabove.

The invention claimed is:

1. A chain-link module, for connection in series with other chain-link modules to form a chain-link converter selectively operable to provide a stepped variable voltage source within a voltage source converter, the chain-link module comprising:
   a first pair of series-connected switching elements separated by a first connection terminal and connected in parallel with first and second series-connected energy storage devices; and
   a second pair of series-connected switching elements separated by a second connection terminal and connected in parallel with one or other of the first and second energy storage devices;
   switching of the switching elements, in use, selectively:
   (i) directing current through the first and second energy storage devices, whereby the chain-link module provides a positive voltage across the first and second connection terminals that can oppose a fault current flowing from the first connection terminal to the second connection terminal;
   (ii) causing current to bypass the first and second energy storage devices whereby the chain-link module provides zero voltage; and
   (iii) directing current through the one of the first and second energy storage devices with which the second pair of switching elements is connected in parallel, whereby the chain-link module provides a negative voltage across the first and second connection terminals that can oppose a fault current flowing from the second connection terminal to the first connection terminal;
   wherein the switching elements are configured to be selectively switched by the module controller which is programmed to control such switching, in order to direct current through the chain-link module along different current flow paths in order to cause the chain-link module to provide the positive, zero, and negative voltage; and
   a module controller programmed to cause the one of the first and second energy storage devices that is connected in parallel to the second pair of series-connected switching elements to store more energy than the other one of the first and second energy storage devices.

2. The chain-link module according to claim 1 wherein at least one of the energy storage devices has a selectively operable rapid discharge circuit connected therewith.

3. The chain-link module according to claim 2 wherein each energy storage device has a selectively operable rapid discharge circuit connected therewith.

4. The chain-link module according to claim 1 wherein at least one of the switching elements in the second pair of switching elements has a lower voltage rating than one or both of the switching elements in the first pair of switching elements.

5. A voltage source converter comprising at least one chain-link converter having a plurality of series-connected chain link modules, at least one of the chain-link modules being a chain-link module according to claim 1.

* * * * *